(12) United States Patent
Ichimura

(10) Patent No.: US 9,151,969 B2
(45) Date of Patent: Oct. 6, 2015

(54) COLOR TUNABLE SUBSTRATE

(75) Inventor: Naoya Ichimura, Uji (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 304 days.

(21) Appl. No.: 13/704,329

(22) PCT Filed: Mar. 26, 2012

(86) PCT No.: PCT/US2012/030612
§ 371 (c)(1),
(2), (4) Date: Dec. 14, 2012

(87) PCT Pub. No.: WO2013/147741
PCT Pub. Date: Oct. 3, 2013

(65) Prior Publication Data
US 2013/0250395 A1    Sep. 26, 2013

(51) Int. Cl.
| | | |
|---|---|---|
| *G02F 1/11* | (2006.01) | |
| *G02F 1/01* | (2006.01) | |
| *G02F 1/21* | (2006.01) | |
| *G02B 5/28* | (2006.01) | |
| *G02B 26/00* | (2006.01) | |

(52) U.S. Cl.
CPC *G02F 1/11* (2013.01); *G02B 5/285* (2013.01); *G02B 26/001* (2013.01); *G02F 1/0131* (2013.01); *G02F 1/21* (2013.01)

(58) Field of Classification Search
CPC ........... G02F 1/11; G02F 1/0131; G02F 1/21; G02B 26/001; G02B 5/285
USPC ....................................... 359/387
See application file for complete search history.

(56) References Cited

U.S. PATENT DOCUMENTS

| | | | |
|---|---|---|---|
| 3,684,683 A | | 8/1972 | Ota |
| 5,438,554 A | * | 8/1995 | Seyed-Bolorforosh et al. ............................ 367/140 |
| 6,950,584 B1 | * | 9/2005 | Suzuki .......................... 385/122 |
| 7,148,516 B2 | | 12/2006 | Gruhlke |
| 7,889,420 B2 | | 2/2011 | Gibson |
| 8,111,369 B2 | | 2/2012 | Shin |
| 2002/0113871 A1 | | 8/2002 | Sakamaki |
| 2004/0108560 A1 | | 6/2004 | Taga |
| 2010/0059780 A1 | | 3/2010 | Su et al. |
| 2011/0014416 A1 | | 1/2011 | Ogawa |
| 2011/0109659 A1 | | 5/2011 | Tang et al. |
| 2011/0109956 A1 | | 5/2011 | Hashimura et al. |
| 2011/0164308 A1 | | 7/2011 | Arsenault et al. |
| 2011/0264065 A1 | | 10/2011 | Arora et al. |

FOREIGN PATENT DOCUMENTS

JP    2008-246961 A    10/2008

OTHER PUBLICATIONS

International Search Report and Written Opinion dated Jul. 13, 2012 as received in related application No. PCT/US2012/030612.
Arsenault, A.et al., "From color fingerprinting to the control of photoluminescence in elastic photonic crystals," Nature Materials, vol. 5, 2006, p. 179-184.
Shinji , M., "Coloring of secret is in the mysterious microstructure," accessed at http://www.jst.go.jp/kisoken/seika/zensen/08matsui/index.html, accessed on Jan. 5, 2015, pp. 1-5.

* cited by examiner

*Primary Examiner* — Scott J Sugarman
*Assistant Examiner* — Vipin Patel
(74) *Attorney, Agent, or Firm* — Maschoff Brennan

(57) ABSTRACT

A color tunable substrate is disclosed. The color tunable substrate includes multiple layers. A color of the color tunable substrate can be tuned by altering or adjusting characteristics of the layers included in the color tunable substrate.

20 Claims, 7 Drawing Sheets

COLOR TUNABLE SUBSTRATE

CROSS-REFERENCE TO RELATED APPLICATION

The present application is U.S. National stage filing under 35 U.S.C. 371 of International Application PCT/US2012/030612, filed on Mar. 26, 2012.

BACKGROUND

Unless otherwise indicated herein, the materials described herein are not prior art to the claims in the present application and are not admitted to be prior art by inclusion in this section.

Color plays a role in many aspects of society. Organizations, companies, and teams are often associated with certain colors, clothes are made in a variety of different colors, and people take pleasure in the colors of their homes. In some instances, color is often the only characteristic that differentiates between otherwise indistinguishable items.

There are many industries where items are manufactured in large quantities and where the only difference is in color. The clothing industry is an example of such an industry. In this industry, the same pattern is often used to sew a large number of articles. The colors of these articles, however, are often different. This gives people the ability to select the colors that they like best and differentiate themselves from others that may be wearing the same article.

The manufactured housing industry is another example of an industry where differences are primarily achieved through the use of color. Manufactured housing often relies on pre-fabricated walls. The walls are often limited in terms of color. As a result, there is less choice.

The color of manufactured homes, or other structures including interior and/or exterior structures, is still a choice because people are able to paint their homes. The reasons for painting homes, however, widely vary. Some people choose to paint their home because they want to change the look of their home. Others may feel that the color of their home does not fit well with other homes in the area or with the surrounding environment. Some people paint their home for environmental reasons. Regardless of the reason, painting the home involves the same steps and faces the same problems. Paint often has an unpleasant smell, takes time to dry, and can be messy. Paint can also be environmentally unfriendly.

SUMMARY

Techniques described herein generally relate to a color tunable substrate. The color tunable substrate includes at least one retention layer, an outer layer, and at least one inner layer disposed between the at least one retention layer and the outer layer. The at least one inner layer is configured to provide a color to the color tunable substrate and is configured for changing the color of the color tunable substrate. In one example, a combination of energy and pressure can be used to change characteristics of the inner layer to tune the color of the color tunable substrate.

In another embodiment, a method for changing a color of a material is provided. The method includes applying a pressure to an outer surface of the material which includes a color tunable substrate. The method also includes applying an energy to the color tunable substrate while applying the pressure. A combination of the pressure and the energy adjusts optical characteristics of the color tunable substrate to change the color of the material.

Another embodiment relates to a pre-fabricated material for use in a structure. The material includes a substrate and a color tunable substrate attached to the substrate. The color tunable substrate includes an outer layer, a first layer having first optical characteristics and covered by the outer layer, a second layer having second optical characteristics, and a retention layer separating the first layer from the second layer.

Another embodiment relates to changing a color of a wall in a prefabricated structure. The method includes installing a wall in the prefabricated structure. The wall includes a substrate and a color tunable substrate attached to the substrate. The color tunable substrate includes multiple layers. The method also includes identifying a desired color for the wall and applying a combination of pressure and energy to the color tunable substrate to change a thickness of at least one of the layers. The combination of pressure and energy changes a color of the wall to the desired color.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
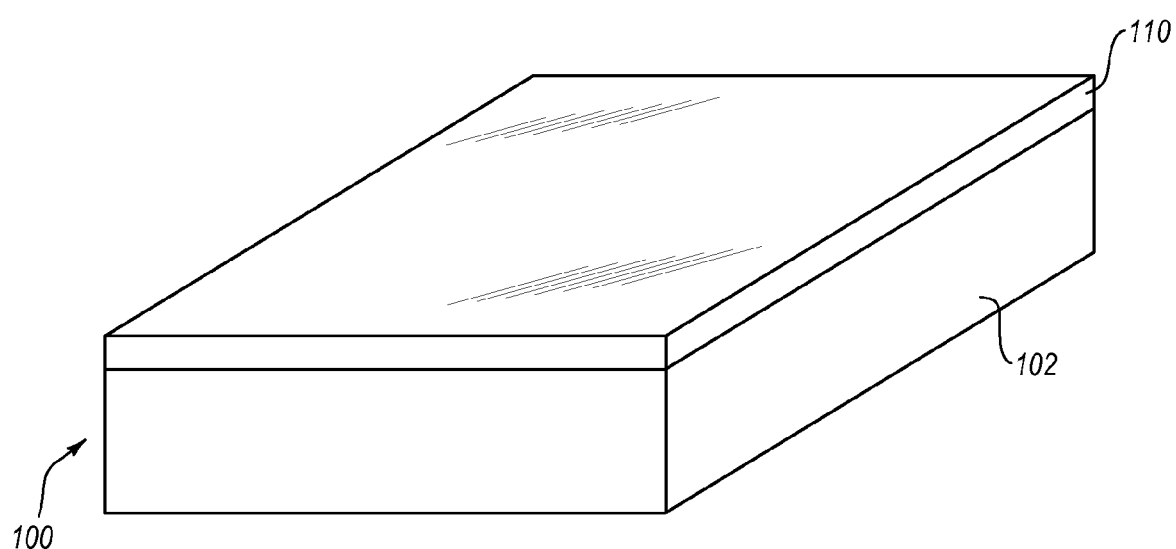
FIG. 1 shows an illustrative embodiment of a material that includes a color tunable substrate.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Embodiments disclosed herein relate to a color tunable substrate. Embodiments of the color tunable substrate can be applied to the surfaces of various materials or other substrates. Once the color tunable substrate is applied to the material, the material has a color or a perceived color that is dependent on the color tunable substrate. The color or perceived color of the material can be tuned by changing or adjusting characteristics of the color tunable substrate.

The color tunable substrate may be applied to a material that may be used in construction. Prefabricated walls or panels for prefabricated homes are an example of a material that may include the color tunable substrate. The material may be configured as panels that can be mounted to a suitable structure. The material may be configured as interior/exterior walls, ceilings, floors, or the like. The color of the material, and thus the prefabricated home or portion thereof, can then be tuned or adjusted by the color tunable substrate.

In one example, the color tunable substrate may include multiple layers. Each layer has characteristics (e.g., optical or physical characteristics) that can be changed or altered. In some embodiments, the characteristics of one layer can be altered or adjusted independently of the characteristics of other layers in the color tunable substrate. The color or perceived color of the color tunable substrate may depend at least in part on how incident light is reflected by the color tunable substrate or by the layers therein. By altering at least some of the characteristics of the color tunable substrate, the incident light is reflected differently. As a result, the color is tuned to a different color. The process of tuning the color tunable substrate can be repeated multiple times.

FIG. 1 shows an illustrative embodiment of a material 100 that includes a color tunable substrate 110, arranged in accordance with at least some embodiments described herein. The color tunable substrate 110 is mounted or applied to a substrate 102. The material 100 thus includes the substrate 102 and the color tunable substrate 110 in this example. The substrate 102 may be a material on which the color tunable substrate 110 may be formed or attached or applied. Various substrate formation methods are known in the art which may be used to form the color tunable substrate 102, including deposition methods epitaxial growth and the like. Alternatively, in embodiments where the color tunable substrate 110 is bonded to the substrate, a bond between the substrate 102 and color tunable substrate 110 may be permanent using any suitable adhesive, epoxy or other attachment mechanism or method. Alternatively, the color tunable substrate 110 may be an integral component of the material 100. The substrate 102 may include, by way of example only, wood, plastic, metal, composite material, ceramic, brick, or the like or any combination thereof.

The color tunable substrate 110 is configured to reflect incident light such that the material 100 has a color. The color of the material 100 can be tuned by changing or adjusting characteristics of the color tunable substrate 110. In one example, the characteristics may include physical characteristics or optical characteristics. In some examples, changes in the physical characteristics have a corresponding effect on the optical characteristics.

Figure 2:
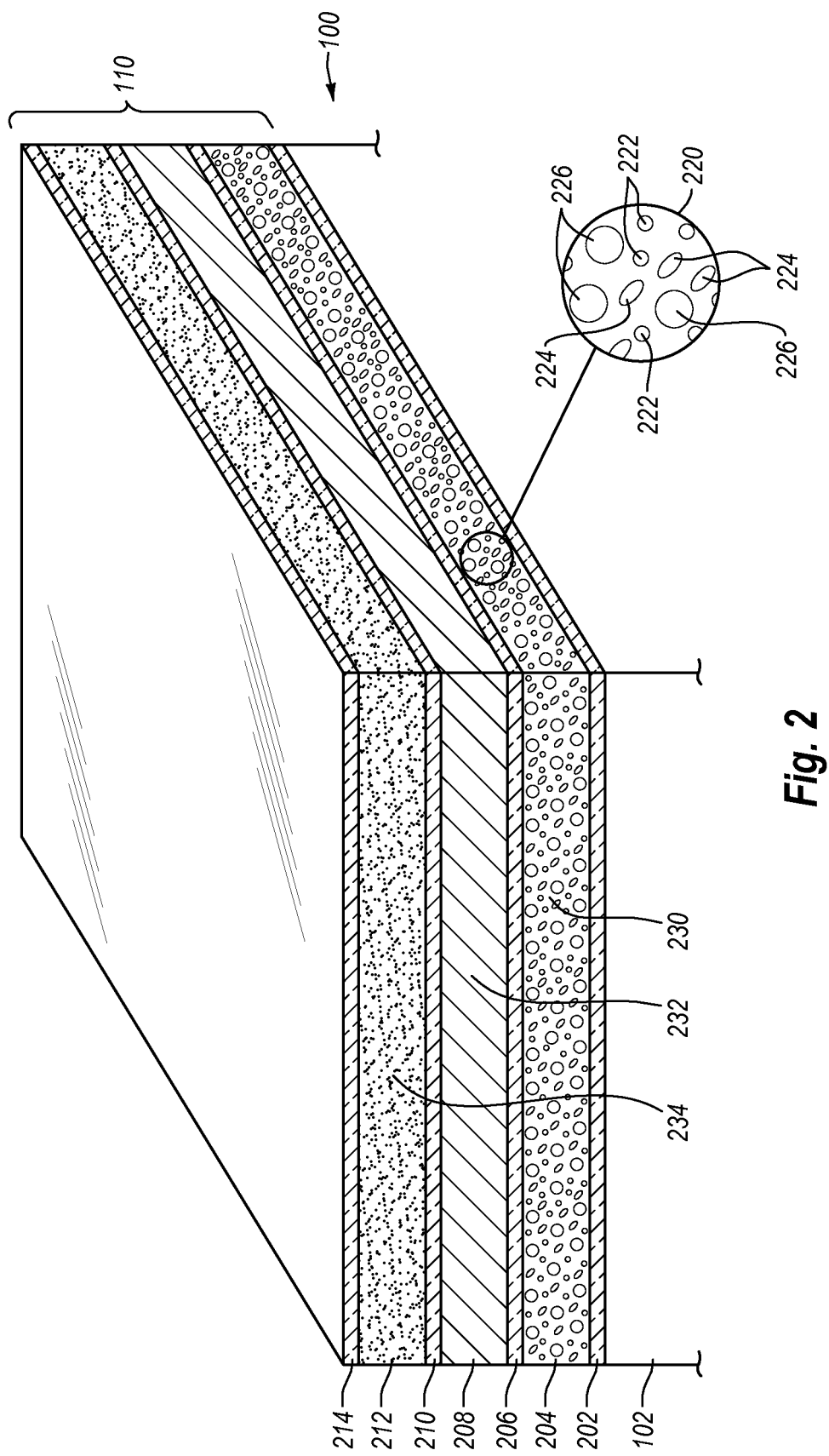
FIG. 2 shows an illustrative embodiment of the color tunable substrate included in the material shown in FIG. 1.

FIG. 2 shows an illustrative example of the color tunable substrate 110 included in the material 100 shown in FIG. 1, arranged in accordance with at least some embodiments described herein. The color tunable substrate 110 of FIG. 2 may include retention layers 202, 206, 210, and 214. The retention layers 202, 206, 210, and 214 are transparent or at least partially transparent to incident light in some embodiments. The retention layer 202 may be more opaque than the other retention layers 206, 210, and 214. The retention layer 202 may not be transparent.

In this example, the retention layer 214 provides an outer surface or outer layer of the material 100. The retention layers 202, 206, 210, and 214 may maintain the layered configuration of the color tunable substrate 110, dissipate light reflected in the layers 204, 208, and 212, and provide protection from water. The retention layers 202, 206, 210, and 214 may be formed of glass, quartz, resin, or the like or any combination thereof or any other suitable material. The retention layers 202, 206, 210, and 214 may be plates of glass, quarts, resin, or the like.

The color tunable substrate 110 in FIG. 2 may also include multiple layers, illustrated in FIG. 2 as a layer 204, a layer 208, and a layer 212, which provide the color to the material 100. The inner layers 204, 208, and 212 are disposed between the retention layer 202 and the retention or outer layer 214. The layers 204, 208, and 212 are configured for changing the color of the color tunable substrate 110. The layers 204, 208, and 212 include, respectively, components 230, 232, and 234. The characteristics of the components 216 determine how incident light is absorbed/reflected. The retention layers 202, 206, 210, and 214 may be configured to confine components 230, 232, and 234 within the layers 204, 208, and 212, respectively. The retention layers 202, 206, 210, and 214 may also keep the components 230, 232, and 234 in, respectively, the layers 204, 208, and 212 separated from each other.

The layers 204, 208, and 212 are configured to reflect incident light in a particular way. The manner in which the light is reflected by the layers 204, 208, and 212 contributes to the color of the material 100. More specifically, incident light that impinges the color tunable substrate 110 is reflected by one or more of the layers 204, 208, and 212. The color of the reflected light, however, may be determined by mutual interference of light reflected by each of the layers 204, 208, and 212. Because the optical and/or physical characteristics of the layers 204, 208, and 212 determine how the incident light is reflected, the color of the material 100 can be determined by changing or adjusting the optical and/or physical characteristics of at least one of the layers 204, 208, and 212.

Each of the layers 204, 208, and 212 has a thickness and a reflective index. The reflective index of each of the layers 204, 208, and 212 can be changed, for example, by altering the corresponding thickness of each of the layers 204, 208, and 212. The change in the physical thickness has a corresponding change in the optical reflection or in the reflective index. When the thickness of one or more of the layers is altered, the color of the material 100 changes or is tuned to another color.

Altering the composition of the components 230, 232, and 234 in the layers 204, 208, and 212 may also have an impact of the reflective index of the layers 204, 208, and 212. The characteristics of each of the layers 204, 208, and 212 can be altered or adjusted independently of other layers in some embodiments.

In this example, the components 230, 232, and 234 included in the layers 204, 208, and 212 are different or have at least some differences. For example, some of the components 230 may be the same as some of the components 232 or 234. In other words, the components in one layer may the same as components in another layer, different from the components in another layer, or partially the same as the components in another layer.

The components 230, 232, and 234 in the layers 204, 208, and 212 may include, by way of example only and not limitation, optical components with characteristic reflective or refractive indexes, pigments that absorb light of specific wavelengths, colorants that are transparent to specific wavelengths of light, absorption characteristics, fluorescent characteristics, or the like or any combination thereof. In addition, the sizes of the components in one layer may be different from the sizes of the components in another layer of the color tunable substrate 110.

Components 220 provide an illustrative enlarged example of the components 230. The components 232 and 234 may be similarly configured. The components 220 may include one or more of spacers 222, particulate components 224, and optical components 226. The components 226 may comprise particles which are capable of absorbing a wavelength of light and/or may have fluorescent properties. The component 226 is smaller than a gap between retention layers 202, 206, 210, and 214. The spacers 222 may comprise particles of different sizes without optical properties, which are smaller than the components 226. In order to stabilize and adjust the gap between retention layers 202, 206, 210, and 214, components 220 may include particulate components 224 with sizes which are smaller than the spacers 222.

In some embodiments, at least some of the components 220 are coated with an adhesive (which may be transparent to light).

The particulate components 224 and/or the optical components 224 may, by way of example and not limitation: have certain refractivity indexes, have pigments to absorb specific wavelengths, have colorants that act as filters for specific wavelengths, emit fluorescent light of specific wavelengths, or have other characteristics.

The spacers 222 may ensure that the particulate components 224 and/or the optical components 226 are appropriately spaced in the various layers of the color tunable substrate 110. The spacers 222 may also provide a resisting force against the pressure from an external layer to the inside of the layers. In other words, the spacers 222 may be configured to maintain a thickness of a layer. The spacers 222, the particulate components 224, and the optical components 226 may also have varying sizes. Thus, the spacers 222 in a given layer may be the same size or different sizes. Similarly, the particulate components 224 and the optical components 226 may also have the same or varying sizes within the same layer.

The color tunable substrate 110 can be formed directly on the substrate 102. In one example, the retention layer 202 is secured to a surface of the substrate 102. A top surface of the substrate 102 may be suitably prepared to receive the retention layer 202. The retention layer 202 can be bonded to the substrate 102 using any suitable epoxy or adhesive, for example. Next, the components 230 that make up the layer 204 are placed on the retention layer 202. The components 230 can be arranged to a predetermined thickness. More specifically, layer 204 may be formed by first electrifying the spacers 222, particulate components 224, or optical components 226 using static electricity. The spacers 222, particulate components 224, and optical components may then be applied to the surface of the retention layer 202 by a spray gun, such as a compression gas spray gun or the like. The spacers 222, particulate components 224, and optical components may be applied independently or they may be mixed together prior to the application process. The thickness of the layer 204 may also be controlled during the application process so as to have a desired thickness.

The retention layer 206 is then placed on the components 230 comprising layer 204. In a similar manner, the components 232 that make up the layer 208 are placed on the retention layer 206. The retention layer 210 is then placed on the components 232. The components 234 that make up the layer 212 are placed on the retention layer 210. Finally, the retention layer 214 is placed on the components 234.

Figure 3:
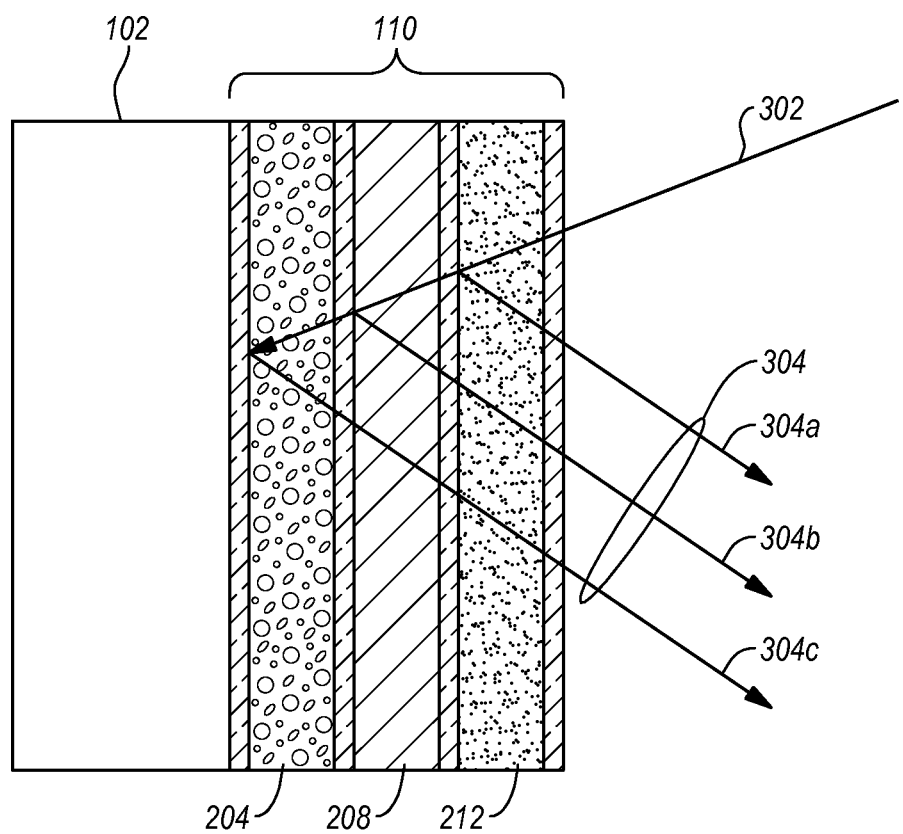
FIG. 3 shows an illustrative embodiment of the material with a color tuned by color tunable substrate.

FIG. 3 shows an illustrative embodiment of a material with a color tuned by a color tunable substrate, arranged in accordance with at least some embodiments described herein. FIG. 3 illustrates an incident light 302 that impinges on the color tunable substrate 110. The incident light 302 is reflected by the color tunable substrate 110 as a reflected light 304. A wavelength or, more generally, wavelength characteristics of the reflected light 304 is determined by the color tunable substrate 110. More specifically, the incident light 302 that hits the surface of the color tunable substrate 110 is reflected in a manner that is related at least in part to the characteristics of the layers 204, 208, and 212 (e.g., the reflective indexes and other characteristics disclosed herein). The wavelength characteristics of the reflected light 304 are determined by the mutual interference of reflected light 304a, 304b, and 304c from, respectively, the layers 204, 208, and 212.

Figure 4:
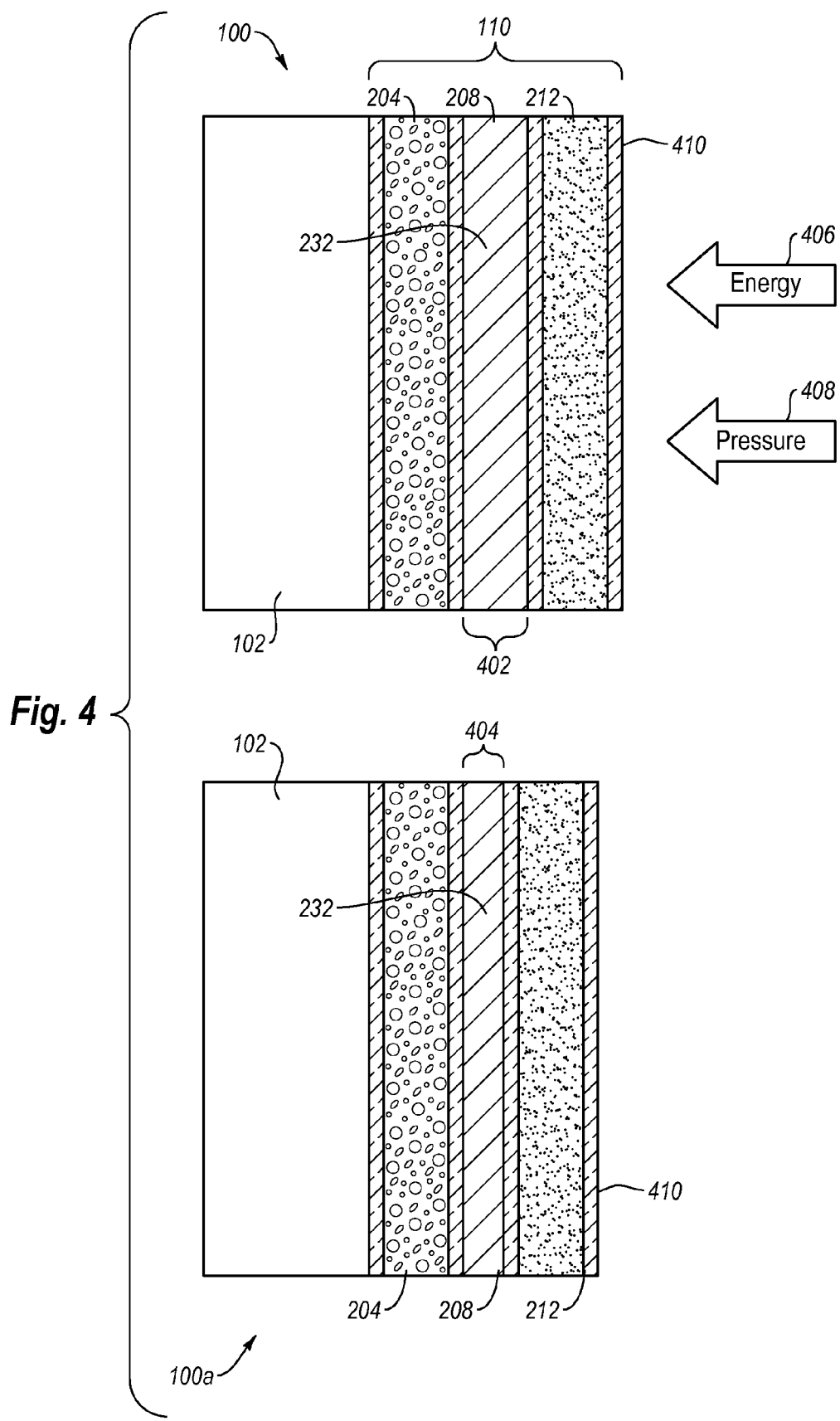
FIG. 4 shows an illustrative embodiment of a method for tuning a color of a material.

FIG. 4 shows an illustrative embodiment of a method for tuning a color of a material, arranged in accordance with at least some embodiments described herein. The method includes various operations, functions or actions as illustrated by one or more of blocks 406 and/or 408. The method may begin at blocks 406 and/or 408. FIG. 4 shows an example of the material 100 prior to tuning the color and an example of the material 100a (which is the same as the material 100 after the color is tuned to another color). In FIG. 4, a combination of energy 406 and pressure 408 is applied to a surface 410 of the material 100 and more specifically to the surface 410 of the color tunable substrate 110. In one example, the energy 406 may include an ultrasonic wave or an impact wave. Other forms of energy 406 that may be used include exchange magnetic fields if the spacers 222 and/or particulate components 224 are composed of a material with magnetic properties.

The energy 406 can be pinpointed to a specific layer of the color tunable substrate 110 and/or to a particular portion of a particular layer in the color tunable substrate 110. In this example, the energy 406 is focused on the layer 208. The pressure 408 is directed towards the color tunable substrate 110 and is an example of positive pressure. The pressure 408 can be applied pneumatically to the color tunable substrate 110.

The energy 406 may be applied by applying the energy 406 to layer 204 by generating a shock wave from one focus point positioned outside of the color tunable substrate 110, setting it with an oval reflector, and delivering the energy using the difference of the acoustic impedance of the material with the surroundings.

The energy 406 may cause components 232 or some of the components 232 in the layer 208 to vibrate. When the components 232 vibrate, the ability of the components 232 to provide a resisting force to the pressure 408 is diminished or removed. As a result, a thickness 402 of the layer 208 changes from the thickness 402 as shown in the material 100 to a thickness 404 as shown in the material 100a. In other words, the combination of the energy 406 and the pressure 408 changes a thickness of the layer 208. In one example, the spacers included in the components 232 vibrate, which allows the thickness to be changed.

The change in the physical characteristic of the layer 208 impacts the reflective index of the layer 208 and/or other characteristics of the layer 208. As a result, the mutual interference of the reflected light 304 is changed, which changes or tunes the color of the material 100.

The ability of the energy 406 to vibrate the components 412 can be targeted in different ways. As previously stated, the energy 406 can be targeted to or focused on a specific layer of the color tunable substrate 110. In another example, the energy 406 may resonate with certain sizes of the components 232. If the components 232 in the layer 208 are sized differently from the components 230 and 234 in the layers 204 and 212, then the energy 406 can generate resonance in the layer 208. In this manner, the energy 406 can also target a particular layer according to frequency.

In another embodiment, the energy 406 can target a specific layer of the color tunable substrate. An ultrasonic wave, for example, can be focused on one of the layers 204, 208 or 212. Focusing the ultrasonic wave enables impact waves to be applied to a specific location or layer. The energy 406 can be focused to a plane or to a line or to other location or shape. As a result, the energy 406 can be controlled (in terms of location and/or depth) to change the characteristics of the layers 204, 208, and 212. The ability to control the focus of the energy 406 also enables the color of the material 100 to be changed selectively, for example, to form patterns of color in the material 100.

In order to transmit the energy of pressure 408 into the material 100, pressure 408 may be generated by periodically vibrating the material 100 with a resonating frequency, causing it to resonate with the components 230 and 234 in the layers 204 and 212. The resonating frequency may be selected according to the size of the components 230 and 234 in the layers 204 and 212. This may cause the thickness of the layers 204 and 212 to change, along with the position in the layers 204 and 212 where the components 230 and 234 are arranged, along with the color and tone of the layers 204 and 212.

The energy 406 may also have sufficient magnitude to physically break some of the components 232 in the layer 208. Breaking the components 232 or at least some of the components 232 may also change the characteristics of the layer 208 even if the thickness remains constant.

Figure 5:
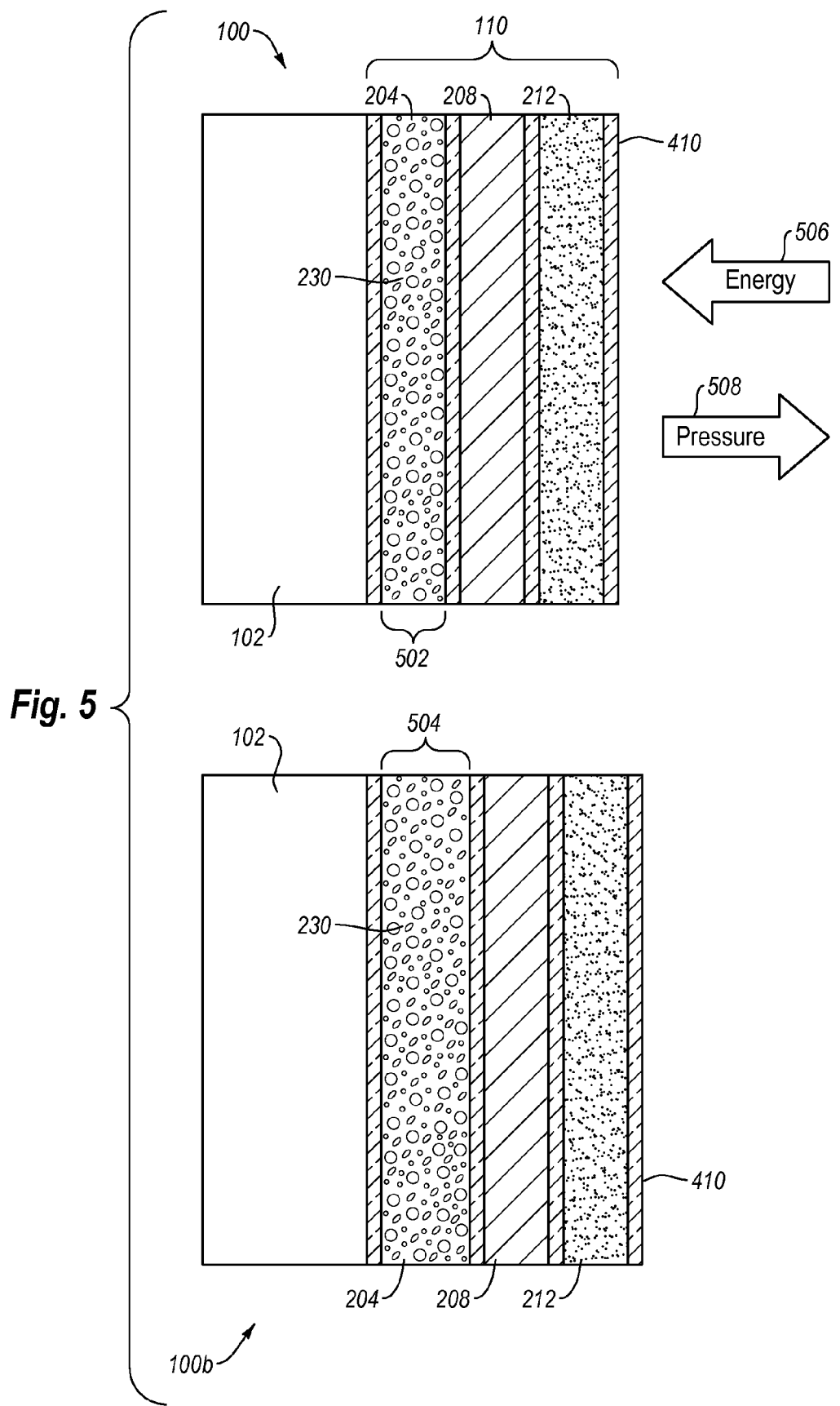
FIG. 5 shows an illustrative embodiment of a method for tuning a color of a material.

FIG. 5 shows an illustrative embodiment of a method for tuning a color of a material, arranged in accordance with at least some embodiments described herein. The method includes various operations, functions or actions as illustrated by one or more of blocks 506 and/or 508. The method may begin at blocks 506 and/or 508. In FIG. 5, a combination of energy 506 (which is an example of the energy 506) and pressure 508 is applied to the surface 410 of the material 100. In this example, the pressure 508 is an example of negative pressure and operates to increase the thickness of at least one layer in the color tunable substrate 110. In this example, the energy 506 is directed to or is targeting the layer 204, which has a thickness 502 in the material 100.

The components 230 or at least some of the components 230 vibrate in response to the energy 506. The vibration of the components 230 allows the pressure 508 to increase the thickness of the layer 204 from the thickness 502 to a thickness 504. The increased thickness has a corresponding effect on the reflective index of the layer 204. Increasing the thickness of the layer 204 tunes the color of the material from the color of the material 100 to the color of a material 100b, which is an example of the material 100 after the color is tuned. In this manner, changes (e.g., thickening, thinning) to any, some, or all of the layers 204, 208 and/or 212 tunes the color of the material 100. Changes to other characteristics (e.g., breaking components in one or more of the layers) may also operate to tune the color of the material 100.

FIGS. 4 and 5 illustrate that the color of the material 100 can be tuned by changing characteristics of the layers 204, 208, and/or 212. Generally, the energy 506 and the pressure 508 or the pressure 408 are applied at substantially the same time. This process of tuning the color of the material 100 can be performed repeatedly and in any order. For example, one layer may be thickened by a combination of energy and negative pressure while another layer is thinned by a combination of energy and positive pressure.

The components 230, 232, and 234 in the layers 204, 208, and 212 can be selected for each of the layers independently. In addition, the components 230, 232, and 234 of the various layers may be selected to achieve a particular range of potential colors or to provide a certain color space. Because the composition (e.g., in terms of size and/or characteristics) of the components 230, 232, and 234 can vary, the range of possible colors may be similarly varied. In other words, the color space of a particular material may be different from the color space of another material with a different tunable color substrate or because of the variances between the components in the tunable color substrates.

Figure 6:
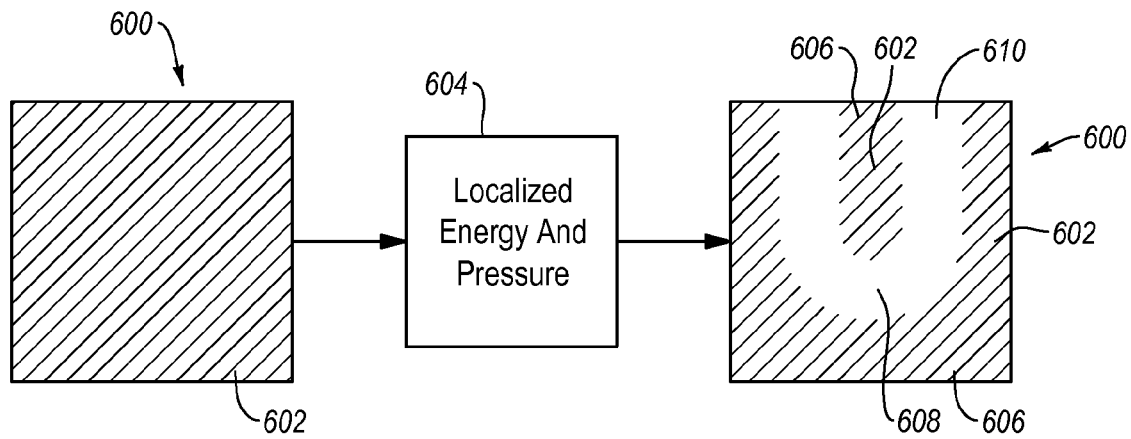
FIG. 6 shows an illustrative embodiment of a method for selectively tuning a color of a material.

FIG. 6 shows an illustrative embodiment of a method for selectively tuning a color of a material 600, arranged in accordance with at least some embodiments described herein. The method includes various operations, functions or actions as illustrated by block 604. FIG. 6 illustrates the material 600 having a color 602. To tune the color 602, a combination 604 of energy and pressure are applied to the material 600. In this example, the combination 604 of energy and pressure are applied locally to an area 608 of the material 600. As previously described, the energy applied to the material 600 can be focused to specific locations. Thus, the energy and pressure can be applied to specific portions or regions of the material 600 rather than to the entire material. As a result, the color of the area 608 is tuned to a color 610, which is distinct from the color 602 of the area 606. In this manner, a pattern 612 can be formed in the material 600. The pattern 612 can be simple or complex and include multiple different colors. By locally applying pressure and energy, selected areas of the material 600 can be selectively tuned.

Positive pressure can be applied using a appropriately sized plate that is pushed against the color tunable substrate 110 while the energy is applied. Negative pressure can be applied using suction for example, to pull on the color tunable substrate.

Figure 7:
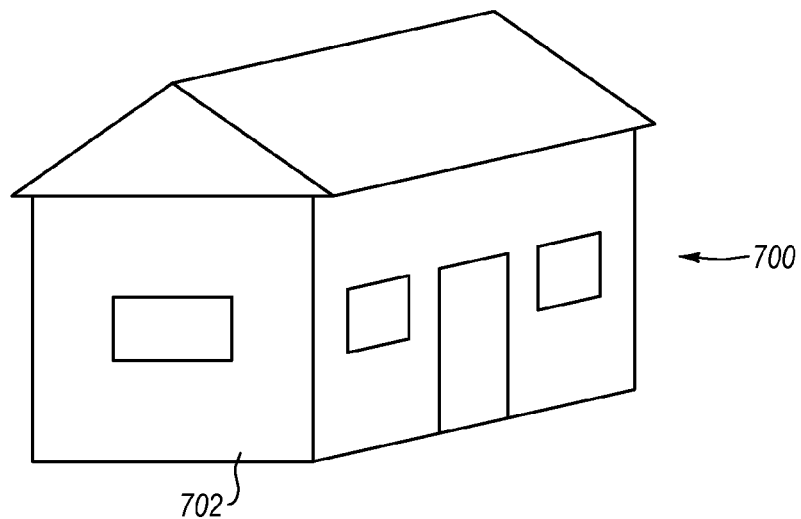
FIG. 7 shows an illustrative embodiment of a structure that includes a color tunable material.

FIG. 7 shows an illustrative embodiment of a structure 700 that includes a color tunable material 702, arranged in accordance with at least some embodiments described herein. The color tunable material 702 is an example of the material 100 shown in FIG. 1. In FIG. 7, walls of the structure 700 are formed from the material 702. The material 702 includes a color tunable substrate that can be tuned as disclosed herein. In one example, the material 702 is a prefabricated wall panel. The ability to tune the color of the material 702 enables the structure 700 to be configured in terms of color.

After installing the color tunable substrate 702, which may be a wall in the structure 700, a desired color of the color tunable substrate 702 is identified. A combination of pressure and energy is then applied to the color tunable substrate 702 to change the color of the material 702 to the identified or desired color.

Figure 8:
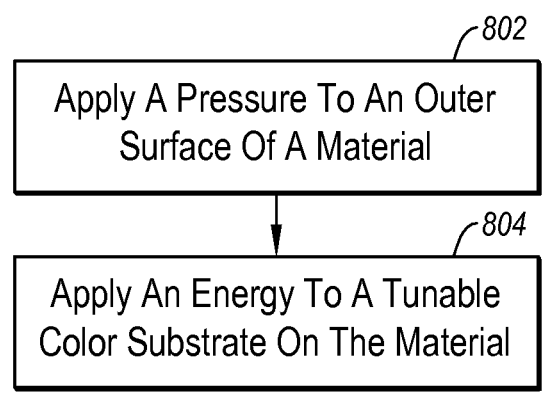
FIG. 8 shows an illustrative embodiment of a method for tuning a color of a material, all arranged in accordance with at least some embodiments described herein.

FIG. 8 shows an illustrative embodiment of a method for tuning a color of a material, arranged in accordance with at least some embodiments described herein. The method includes various operations, functions or actions as illustrated by one or more of blocks 802 and/or 804. The method may begin at blocks 802. In box 802 ("Apply a Pressure to an Outer Surface of a Material"), a pressure is applied to an outer surface of a material. The material includes a color tunable substrate. The color tunable substrate may be applied to an underlying substrate to form the material or the color tunable substrate may be an integral part of the material. The outer surface of the tunable color substrate may be the same as the outer surface of the material. Block 802 may be followed by block 804. In box 804 ("Apply an Energy to a tunable Color Substrate on the Material"), an energy is applied to the tunable color substrate.

In one embodiment, the pressure and the energy are applied at the same time or at substantially the same time. The device used to apply the energy may also be configured to apply the pressure. As the energy causes at least some of the components in at least one of the layers to vibrate, the pressure can either thicken or thin the targeted layer. The energy may be an ultrasonic wave that is focused on a targeted layer and the pressure can be a positive pressure to thin the targeted layer. The pressure may alternatively be a negative pressure that thickens the targeted layer. Once the energy is removed from the material or more specifically from the color tunable substrate, the components in the targeted layer cease vibrating, allowing the resistive force that holds the layer in its new configuration to be restored.

As previously stated, the spacers included in the components are configured to maintain the thickness of the layer. The spacers in a given layer may be of different sizes and may be coated with an adhesive. The adhesive renders the spacers less mobile inside the layers. The lack of mobility is at least partly responsible for the resistive force. The vibration of the spacers renders the spacers more mobile, which reduces the resistive force and allows the thickness of the layer to be changed.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A color tunable substrate comprising:
    at least one retention layer;
    an outer layer; and
    two or more inner layers disposed between the at least one retention layer and the outer layer, the inner layers configured to provide a color to the color tunable substrate based at least partially on thicknesses of the inner layers, wherein:
    a first of the inner layers is configured for changing the color of the color tunable substrate at least partially through introduction of ultrasonic waves at a first frequency in combination with a pressure, and
    a second of the inner layers is configured for changing the color of the color tunable substrate at least partially through introduction of ultrasonic waves at a second frequency in combination with the pressure.

2. The color tunable substrate of claim 1, wherein at least one of the inner layers comprise a plurality of layers, each layer of the plurality of layers having an adjustable reflective index, wherein the reflective index of each layer of the plurality of layers is changed by adjusting a thickness of the layer.

3. The color tunable substrate of claim 1, wherein at least one of the inner layers comprise a plurality of layers, each having an adjustable thickness.

4. The color tunable substrate of claim 1, wherein at least one of the inner layers comprise a plurality of layers, each layer of the plurality of layers having a plurality of components configured to control a thickness of the layer by adjusting a thickness of the layer.

5. The color tunable substrate of claim 1, wherein at least one of the inner layers comprise a plurality of layers, and wherein the thickness of each layer of the plurality of layers is independently adjustable from other layers in the plurality of layers.

6. The color tunable substrate of claim 1, wherein each of the inner layers includes an optical component having optical characteristics configured to contribute to the color of the color tunable substrate and a spacer component configured to control a thickness of the inner layer.

7. The color tunable substrate of claim 6, wherein the pressure is applied towards the outer layer.

8. The color tunable substrate of claim 6, wherein the spacer component in each inner layer responds to the first frequency or the second frequency and wherein the first frequency or the second frequency of the ultrasonic waves determines which layer of the first of the inner layers or the second of the inner layers is affected by the combination of the pressure and the ultrasonic waves.

9. A method for changing a color of a material, the method comprising:
    applying a pressure to an outer surface of the material, the material including a color tunable substrate having a plurality of layers; and
    applying an ultrasonic wave to the color tunable substrate while applying the pressure, wherein a combination of the pressure and the ultrasonic wave adjusts optical characteristics of the color tunable substrate to change a color of the material.

10. The method of claim 9, further comprising applying the ultrasonic wave to a specific layer included in the plurality of layers.

11. The method of claim 9, wherein the ultrasonic wave and pressure change a thickness of at least one layer in the plurality of layers to at least partially change the color of the material.

12. The method of claim 9, further comprising selectively applying the pressure and the ultrasonic wave to the outer surface to form a pattern in the material.

13. The method of claim 9, wherein applying a combination of the pressure and the ultrasonic wave further comprises applying one of a positive pressure directed towards the substrate or a negative pressure directed away from the substrate and an ultrasonic wave at a first frequency to change a thickness of a particular layer of the plurality of layers, wherein the ultrasonic wave vibrates particulates included in the particular layer such that the pressure changes the thickness.

14. The method of claim 13, further comprising breaking at least some of the particulates in the particular layer while adjusting the thickness of the particular layer with the energy of the ultrasonic wave.

15. The method of claim 9, wherein a reflective index of each layer of the plurality of layers depends on a thickness of the corresponding layer, wherein adjusting the thickness changes the color of the material by changing the reflective index of the corresponding layer.

16. The method of claim 9, wherein the material comprises a wall in a prefabricated structure.

17. A material for use in a structure, the material comprising:
    a substrate; and
    a color tunable substrate attached to the substrate, the color tunable substrate including:
    an outer layer;
    a first layer having first optical characteristics, the first layer covered by the outer layer and including first spacers, first particulate components, and first optical components;
    a second layer having second optical characteristics and including second spacers, second particulate components, and second optical components; and
    a retention layer separating the first layer from the second layer,
    wherein:
    the second spacers are sized differently from the first spacers such that the first spacers vibrate in response to a first frequency and the second spacers vibrate in response to a second frequency,
    a combination of pressure on the color tunable substrate and an ultrasonic wave at the first frequency changes a thickness of the first layer, and
    a combination of the pressure on the color tunable substrate and an ultrasonic wave at the second frequency changes a thickness of the second layer.

18. The material of claim 17, wherein the pressure is a positive pressure directed towards the substrate or a negative pressure directed away from the substrate, wherein the positive pressure decreases the thickness and the negative pressure increases the thickness.

19. The material of claim 17, wherein a change in the thickness of the first layer, the thickness of the second layer, or both the thickness of the first layer and the thickness of the second layer changes a reflection light spectra of the color determining structure to change the color of the material.

20. The material of claim 17, further comprising a second retention layer between the substrate and the second layer, the retention layers each comprising at least one of resin, quartz, or glass.

\* \* \* \* \*